United States Patent [19]
Fukuda

[11] Patent Number: 5,830,513
[45] Date of Patent: Nov. 3, 1998

[54] TIRE-HANDLING APPARATUS

[75] Inventor: Hideki Fukuda, Nagasaki-ken, Japan

[73] Assignee: Mitsubishi Jukogyo Kabushiki Kaisha, Tokyo, Japan

[21] Appl. No.: 784,989

[22] Filed: Jan. 17, 1997

[30] Foreign Application Priority Data

Feb. 26, 1996 [JP] Japan ..................................... 8-038277

[51] Int. Cl.$^6$ ............................ B29C 31/08; B29D 30/06
[52] U.S. Cl. ............................................................... 425/38
[58] Field of Search ..................................... 425/28.1, 38

[56] References Cited

U.S. PATENT DOCUMENTS

| | | | |
|---|---|---|---|
| 3,913,457 | 10/1975 | Hawley . | |
| 4,190,406 | 2/1980 | Geck et al. | 425/38 |
| 4,279,438 | 7/1981 | Singh | 425/38 |
| 4,401,422 | 8/1983 | Amano et al. | 425/38 |
| 4,608,219 | 8/1986 | Singh et al. | 425/38 |
| 5,017,111 | 5/1991 | Drewel et al. | 425/38 |
| 5,395,150 | 3/1995 | Imler et al. | 425/38 |
| 5,441,587 | 8/1995 | Byerley . | |

FOREIGN PATENT DOCUMENTS

| | | |
|---|---|---|
| 60-6417 | 1/1985 | Japan . |
| 2 092 100 | 8/1982 | United Kingdom . |

OTHER PUBLICATIONS

"Mitsubishi Tire Curing Press, Rolling–in–Bladder Type," Published 1992 (brochure).

*Primary Examiner*—James P. Mackey
*Attorney, Agent, or Firm*—Michael N. Meller

[57] ABSTRACT

A tire-handling apparatus is provided for moving a tire into and out of a tire processor, such as a tire-curing press. The apparatus utilizes tire-gripping members, such as a plurality of shoes, which may be moved between an extended and a retracted position for gripping and releasing the tire respectively. Also included are operating members for properly operating the gripping members between their respective positions. The operating apparatus includes at least two cylinders having piston rods extending from first ends thereof. The second ends of the cylinders are mounted in series to permit the shoes for mounting the tire to be easily extended and retracted without substantial tire deformation, regardless of the size of the tire.

4 Claims, 2 Drawing Sheets

TIRE-HANDLING APPARATUS

The present invention relates to a tire-handling apparatus. More particularly, the present invention relates to a loader for a tire-curing press, into which a tire to be cured is loaded.

BACKGROUND OF THE INVENTION

In a tire-curing press, tires of different sizes are cured or vulcanized by changing various elements in the press. The tire loader uses a plurality of grippers or holding "shoes" for generally supporting the tire in a horizontal position to properly place the "green" tire in the curing mold. The grippers of the loader can be extended or retracted to accommodate different sizes of tires. Accordingly, in a tire loader attached to such a curing press, in order to process tires of different sizes without changing tools, the strokes for extending and/or retracting the plurality of shoes which hold a tire is determined and controlled by a stopper and the like according to the size of the tire to be processed. It should be noted, however, that stretching the tire diameter directly with a cylinder can result in deforming the shape of the tire.

A tire-curing press, as discussed above, is manufactured by Mitsubishi Heavy Industries, Ltd., Tokyo, Japan and is described in sales literature entitled "Mitsubishi Tire-Curing Press, Rolling-in-Bladder Type," HD70-G-RIB9E1-A-O. This literature describes a curing press using a rolling-in-bladder, particularly for radial tires, to obtain the best uniformity of the cured tire. Another tire handling apparatus is disclosed in laid-open Japanese patent application No. 60-6417, published Jan. 14, 1985.

Conventional curing presses can have the following problems. In order to maintain the quality of the produced tire, a gripping method called the inner grip method is generally utilized to hold a tire to be cured. In such a method the upper bead of the tire to be cured is gripped by a shoe from the inside. However, this method requires a stopper and the like arranged on the shrunken diameter side (the release position) to control the shoe strokes so that it does not interfere with the bladder clamp ring and the like. This is required when retracting the diameter of the shoe to release the grip on the tire, after hanging the tire to be cured in a predetermined position in the curing press.

Such an arrangement increases the work of the operator and also increases the downtime in the operation due to changing the tire size.

Attempts have been made to solve these problems by detecting the position of the shoe using a sensor, such as an encoder and the like. This enables a remote control for changing the shoe position to regulate the extending/retracting strokes of the shoe. This can solve the above-mentioned problems, but it has the drawback that the device becomes more expensive.

SUMMARY OF THE INVENTION

It is accordingly an object of the present invention to provide a tire-handling apparatus for moving a tire into and out of a tire processor, which can eliminate the manual control of the strokes for opening and closing the gripper shoes even when the size for the tire to be cured is changed. This eliminates the additional expensive or complicated device, such as the encoder, which continually detects the shoe position.

It is a further object of the present invention to hold the tire securely even if the upper bead section of the tire to be cured and the gripper or shoe gripping the same are slightly off-center due to the deformation of the tire to be cured.

It is a further object of the present invention to simplify the overall makeup of the apparatus so that existing tire loaders may be used, it only be necessary to change the cylinders, the mount position, and the like, and still achieve the advantages of the apparatus incorporating the principles of the present invention.

In accordance with an embodiment of the present invention, a tire-handling apparatus is provided for moving a tire into and out of a tire processor. The apparatus includes tire-gripping means operable between an extended position, for securely holding the tire to be moved, and a retracted position, wherein the tire is released from the gripping means. Operating means are included for operating the gripping means between its retracted and its extended positions when desired. Such operating means can include a plurality of cylinders, each of the cylinders respectively having a first end through which a piston rod extends and a second end. The piston rod of a first of the plurality of cylinders is connected to the gripping means. A second of the plurality of cylinders is arranged in series with the first of the cylinders by having the second ends of the first and second cylinders connected to each other.

In a preferred embodiment of the present invention, one of the first and second cylinders is a long-stroke cylinder and the other cylinder is a short-stroke cylinder.

In accordance with a further preferred embodiment of the present invention, the first cylinder is a long-stroke cylinder having a brake and the second cylinder is a short-stroke cylinder.

The apparatus may be used in a tire processor, such as a tire vulcanizer or tire-curing apparatus. The gripping means can include a plurality of tire-handling grippers which are slidably mounted in the handling apparatus.

In another embodiment of the present invention, the apparatus includes a ring which is rotatably mounted within the apparatus. The plurality of grippers are mounted on the ring such that when the ring is rotated in a first direction, the grippers are simultaneously moved to their extended position. When the ring is rotated in the opposite direction from the first direction, the grippers are simultaneously moved to their retracted position.

In a preferred embodiment of the present invention, the first cylinder, noted above, is connected to the ring for rotating the ring in both the first and opposite directions whenever desired.

In a further preferred embodiment of apparatus incorporating the principles of the present invention, the cylinder has a brake for maintaining the ring in any rotational position desired.

BRIEF DESCRIPTION OF THE DRAWINGS

The above and other objects, features and advantages of the present invention will become more apparent from the following detailed description taken with the accompanying drawings in which.

DESCRIPTION OF A PREFERRED EMBODIMENT

Figure 1:
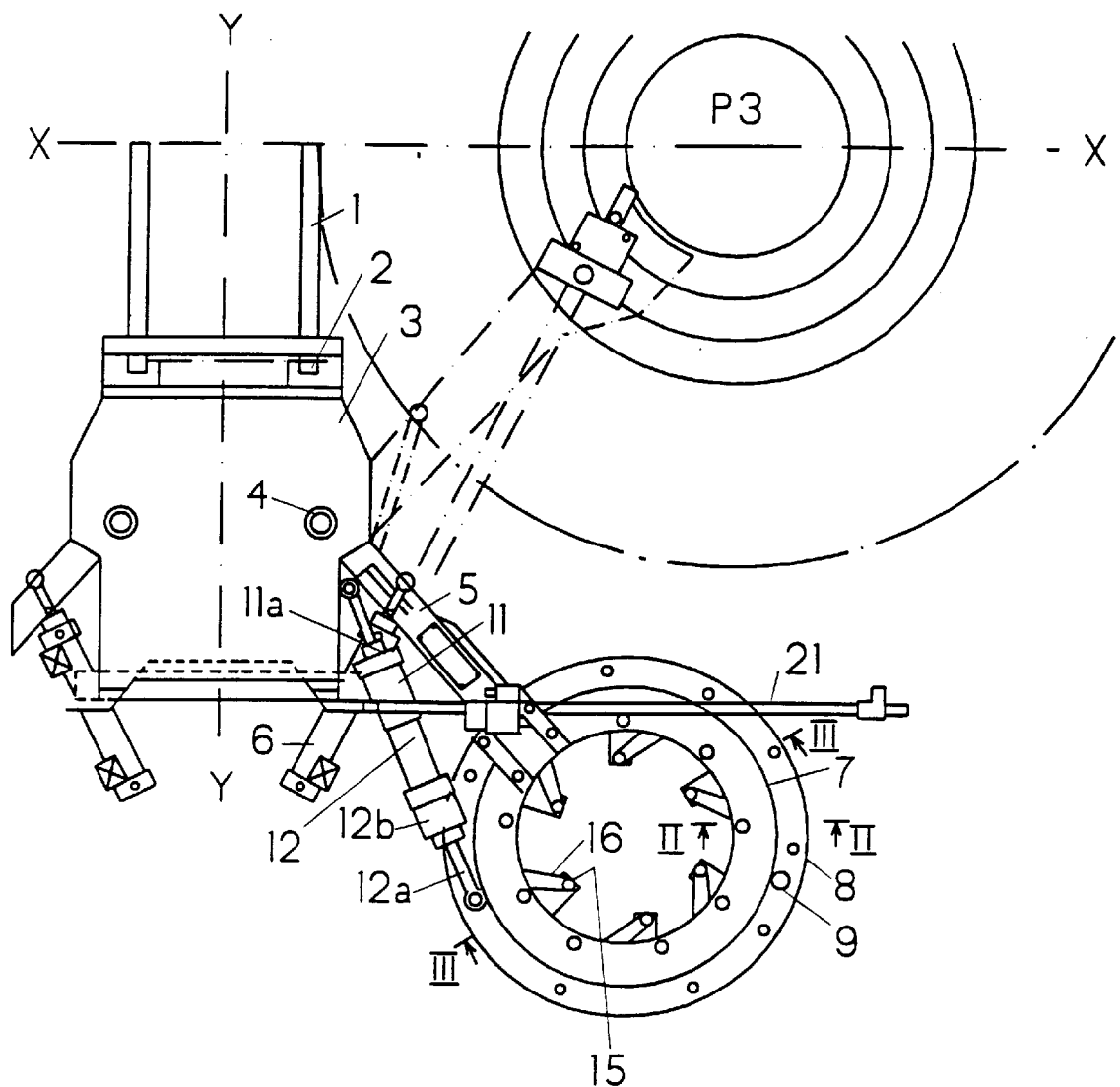
FIG. 1 is a plain view of a tire-handling apparatus of a first embodiment of the present invention.

Referring to the drawings and more particularly to FIG. 1, a tire-handling apparatus in the form of a tire loader is shown utilized, for example, in a tire-curing press. The tire is held generally in a horizontal position and is being viewed from above in FIG. 1. The tire is to be moved from the mold of the curing apparatus located at position P1 to a second position P2, where the cured tire is released.

FIG. 1 has a vertical axis Y—Y which is the centerline of a tire-curing press. That is, the press shown in FIG. 1 is a twin-type in which two molds for the tire-curing process are attached symmetrically with respect to the Y—Y axis in FIG. 1. It can be seen that the position P2 is located along an axis X—X which is perpendicular to the axis Y—Y.

In FIG. 1, the numeral 1 designates the main frame of the tire-curing press. An elevator rail 2 of the tire loader is secured vertically against the main frame 1. An elevator 3 is moved along the rail 2 which works as a guide for lifting the elevator 3. The elevator 3 is lifted by means of a lift-driving means (not illustrated).

A swing arm 5 for moving the tire between the position P1 and the position P2 is shown in solid form in position P1, but in dotted solid lines in its second position at P2.

The swing arm 5 is connected at its forked end to a base ring 7 of a tire-holding section. The base ring 7 may best be seen in FIG. 3. The other end of the swing arm 5 is pivotally mounted via a shaft 4 to the elevator 3. Also connected to the elevator 3 is an oscillating cylinder 6. The cylinder 6 is connected both to the elevator 3 and the swing arm 5 via pins that may be seen at the respective connection points. The limit through which the cylinder can move to swing the swing arm 5 from the position P1 to the position P2 is controlled by a stopper member 21 which is interposed between the swing arm 5 and the elevator 3.

Figure 2:
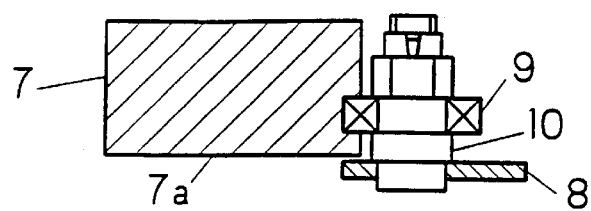
FIG. 2 is a cross-sectional view of a portion of FIG. 1 taken along the line II—II.
Figure 3:
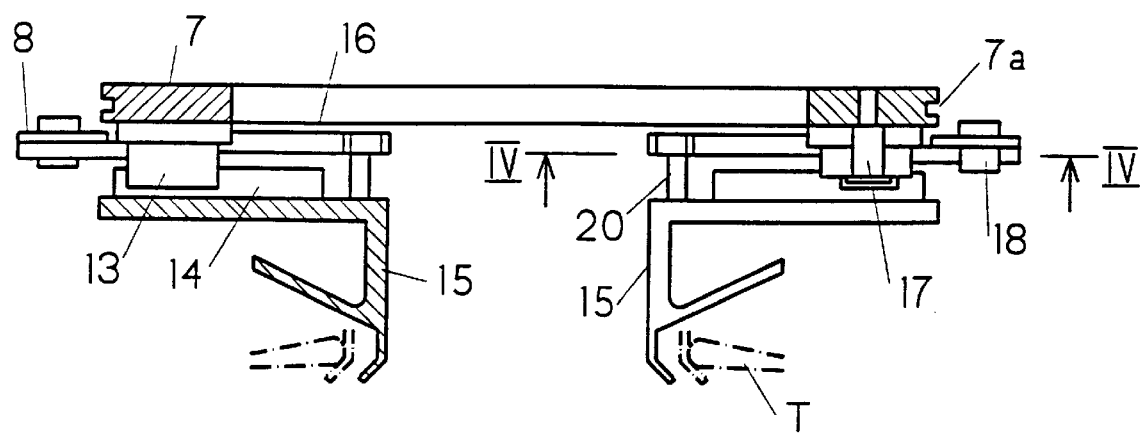
FIG. 3 is a cross-sectional view of the embodiment of FIG. 1 taken along the line III—III.

The base ring 7 of the tire-holding section has an annular groove 7a, as best seen in FIGS. 2 and 3. Cooperating with the annular ring 7a is a cam roller 9, shown meshed with the ring 7 in FIG. 2. A ring 8 for opening and closing the shoes for gripping the tire is shown mounted concentrically with the base ring 7. A plurality of pins 10 are fixed on the open/close ring 8. Each of the pins 10 has a cam roller 9 respectively mounted thereon. As noted above, the cam rollers mesh with the annular groove 7a of the ring 7. The ring 8 is rotated simultaneously and concentrically with the base ring 7 by a driving means, which will be described subsequently in greater detail. The driving means extends and retracts shoes for gripping the tire.

As best seen in FIG. 3, the gripping means for securing and releasing the tire is illustrated in the form of shoes 15 which can be moved toward the center of the ring 8 or away from the center. In FIG. 1 it can be seen that the shoes 15 can be moved substantially radially with respect to the rings 7 and 8.

The shoes 15 grip the upper bead section of the tire to be cured from the inside. Each of the shoes 15 is slidably mounted in the base ring 7 by means of a rail 14 secured on the shoes 15, as well as by a linear bearing 13 which is engaged with the rail 14 and is secured on the base ring 7.

Figure 4:
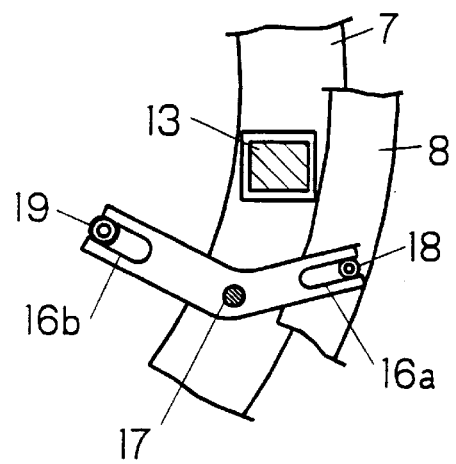
FIG. 4 is a sectional view taken along the line IV—IV of FIG. 3.

As best seen in FIG. 4, a lever 16 is pivotally mounted on the base ring 7 by means of pins 17. The lever 16 has cam grooves 16a and 16b at the ends thereof. The cam groove 16a engages a cam roller 18 which is rotatably mounted in the open/close ring 8. The second cam groove 16b is engaged with a cam roller 19 rotatably mounted in the shoes 15 by means of pins 20.

It can thus be seen that when the ring 8 is rotated, the plurality of shoes 15 will slide simultaneously in substantially the radial direction of the rings 7 and 8 whereby the shoes can be extended or retracted in a pitch circle.

In order to extend and retract the shoes 15, driving means are provided which is made up of a short-stroke cylinder 11, shown in FIG. 1, and which can be a cylinder. Also utilized is a conventional long-stroke cylinder 12 having a brake. The cylinder 11 has a piston rod 11a connected to the swing arm 5 via pins. The cylinder 12 has a piston rod 12a which is connected to the open/close ring 8 also via pins. The ends of the cylinders 11 and 12, which are opposite from the respective ends thereof through which the piston rods extend, are connected to each other in series by means of bolts.

It should be noted that there are two types of cylinders which may be used for the cylinder 12 having a brake. One type locks the piston rod 12a and actuates the brake when air under pressure is supplied to the brake 12b. The other type of cylinder 12 releases the brake when air is supplied to the brake 12b. From the safety point of view, the latter type is preferred.

In operation, if the brake 12b of the cylinder 12 is actuated, the piston rod 12a will be locked and prevented from movement. The shoes 15 will hold the tire T to be cured and will wait at the upper side of the receiving position P1.

Under these conditions, if the curing of the tire is completed in the mold at position P1, the base of the mold will be opened and the cured tire unloaded. Thus, the swing arm 5 of the loader will swing to the center position P2 of the base. The elevator 3 will be lowered and the next tire T to be cured will be lowered to a predetermined position on the base. In the curing process, a bladder or the like is inserted within the tire to be cured, and the tire to be cured is passed over to the curing press.

Under these conditions, the short-stroke cylinder 11 is actuated to rotate the ring 8 and to reduce the diameter of the shoes 15 by means of the lever 16. That is, the plurality of shoes 15 will be moved radially inward toward the center of the rings 7 and 8. This is the position shown in solid lines in FIG. 3. Accordingly, the tire T will be released.

Once the plurality of shoes are moved to their retracted position so that the diameter thereof is reduced, the elevator 3 is raised and the swing arm 5 will swing in the opposite direction to that noted above to return the shoes 15 to the home position in the empty condition.

The base will be closed to start the curing process in the curing press while in the loader for the tire-curing press, the brake 12b of the cylinder 12 is released immediately if the next tire to be cured has been supplied to the receiving position P1. If the tire has not yet been supplied, the brake 12b will be released after such tire is supplied.

Furthermore, the cylinder 12 having the brake will be actuated additionally to reduce temporarily the diameter of the shoes 15 to their smallest diameter. Then the elevator 3 will be lowered, and the shoes 15 will reach inwardly at the upper bead section of the tire T to be cured (see the solid lines in FIG. 3).

Now the short-stroke cylinder 11 and the long-stroke cylinder 12 are actuated in the opposite directions to rotate the ring 8 to move the shoes 15 to their extended position. The shoes 15, as shown in the dotted lines in FIG. 3, will contact the bead section of the tire T to be cured. Then the brake 12b of the cylinder 12 is actuated to lock the position of the piston rod 12a of the cylinder 12.

It should be noted that it is necessary and desirable to use a low air pressure for moving the cylinder 12 in advance to a value for which the bead section of the tire will not be deformed into a polygon shape after the shoes 15 contact the bead section of the tire T to be cured.

Now, if the elevator 3 is raised under these conditions, the tire T to be cured will be gripped by the shoes 15 and raised. After reaching the home position, it will wait until the ongoing curing process is finished.

The advantages of the tire-handling apparatus in the form of a loader for a tire-curing press of the type described above is that the loader determines or selects in advance the strokes of the short-stroke cylinder 11, which strokes are necessary for holding and releasing the tire. These movements will not interfere with the clamp ring of the bladder and the like at a full stroke.

The long-stroke cylinder 12 corresponding to the changes in the diameter of the bead is the one having a brake, and it is arranged, as noted above, in series with the short-stroke cylinder 11. Accordingly, even if the size of the tire changes, no manual control of the open/close strokes of the shoes 15 is required. Nor is it necessary to have any additional expensive or complicated devices, such as an encoder for continually detecting the positions of the shoes 15.

Furthermore, even if the upper bead section of the tire T to be cured and the plurality of shoes 15 gripping such tire are slightly off-center due to the deformation of the tire to be cured, it is clear that the grippers or shoes 15 can securely hold the tire.

As has been mentioned above, the structure incorporating the principles of the present invention is relatively simple and existing loaders can be used by changing only the cylinders and the mount positions, thereby saving substantial expense in replacing the tire loader.

While the present invention has been described with respect to particular embodiments, it is clear that modifications may be made utilizing the principles of the present invention without departing from the scope of the present invention as defined by the following claims.

What is claimed is:

1. A tire-handling apparatus for moving a tire into and out of a tire processor comprising:

tire-gripping means operable between an extended position for securely holding the tire to be moved and a retracted position wherein said tire is released from said gripping means; and operating means for operating said gripping means between its retracted and extended positions when desired, said operating means including a plurality of cylinders, each of said cylinders respectively having a first end through which a piston rod extends and a second end, the piston rod of a first of said plurality of cylinders being connected to said gripping means and a second of said plurality of cylinders being arranged in series with said first of said cylinders by having said second ends of said first and second cylinders connected to each other, wherein said tire processor is a tire curing press and said gripping means includes a plurality of tire-handling grippers slidably mounted in said tire-handling apparatus, wherein said tire-handling apparatus includes a ring rotatably mounted therein and coupled to said operating means said plurality of grippers being mounted on said ring whereby when said ring is rotated by said operating means in a first direction, said grippers are simultaneously moved to their extended position and when said ring is rotated by said operating means in the opposite direction, said grippers are simultaneously moved to their retracted position.

2. A tire-handling apparatus as claimed in claim 1, wherein said piston rod of said first of said cylinders is connected to said ring for rotating said ring in said first and said opposite directions when desired.

3. A tire-handling apparatus as claimed in claim 2, wherein said first of said cylinders has a brake for maintaining said ring in any rotational position desired.

4. A tire-handling apparatus as claimed in claim 1, wherein said plurality of grippers are mounted on said ring to move in a substantially radial direction of said ring when said ring is rotated.

* * * * *